Patented Oct. 9, 1934

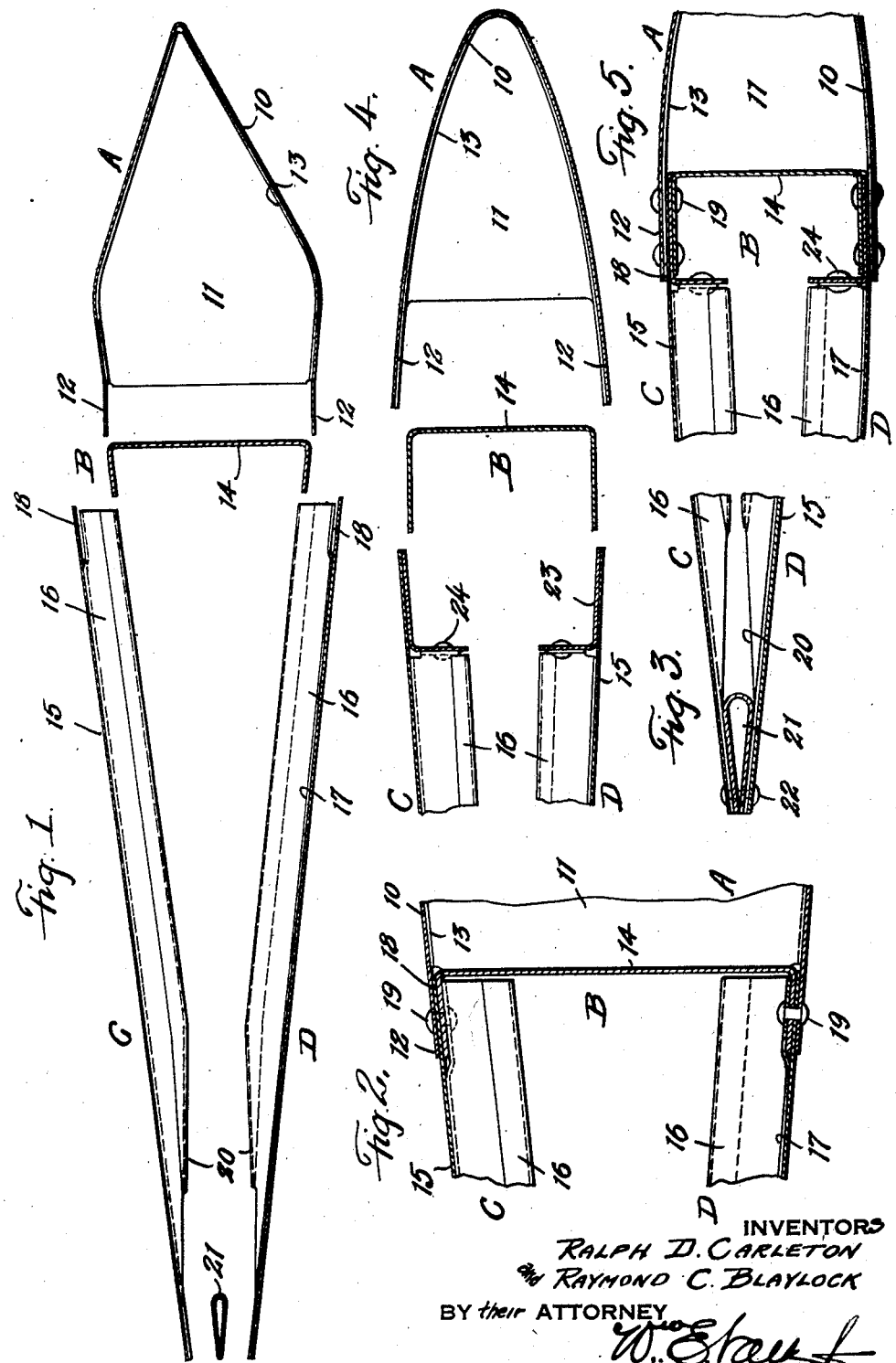

1,976,480

UNITED STATES PATENT OFFICE 1,976,480

AEROFOIL

Ralph D. Carleton, Snyder, and Raymond C. Blaylock, Kenmore, N. Y., assignors to Curtiss Aeroplane & Motor Company, Inc., a corporation of New York Application October 29, 1931, Serial No. 571,702

4 Claims. (Cl. 244—31)

Our invention relates to aerofoils and more particularly to improvements both in the method of construction and in the actual construction of such ordinary aerofoils as ailerons, elevators, rudders, etc., of aircraft.

It is the usual practice in aerofoil construction to build up, as it were, a suitable skeleton (consisting of one or more beams, a plurality of ribs and a suitable number of fittings), and to thereafter envelope or cover said skeleton with an outer skin of either fabric, metal or veneer.

The present invention, as distinguished from said prior practice, contemplates a construction in which the aerofoil per se consists of a number of sub-assemblies, each complete in and of itself; the sub-assemblies, when fastened together, constituting the completed whole or finished product. Preferably the sub-assemblies consist of a nose or leading edge portion, a beam or intermediate portion, and two or more skin or cover portions which may or may not be internally reinforced before assembly, said reinforcing constituting self-bracing of the cover portions without the need of additional rib structure.

One advantage of an aerofoil thus characterized is that it can be manufactured and assembled cheaply and quickly since machine screws and the like are not required to be used.

A further advantage of the invention is that in the final assembly of the several sub-assemblies, rivets can be used; there being no joints or lines of fastening where a riveting machine cannot be employed.

A still further advantage of the invention is that all necessity for a seam at the nose or leading edge of the aerofoil is eliminated.

Other objects and advantages of the invention will be hereinafter noted.

In the drawing:

Fig. 1 is a transverse section of an aircraft control surface (aerofoil) showing the sub-assemblies detached;

Fig. 2 is an enlarged section of a part of an assembled aerofoil showing the nose and cover sections fastened to the beam section thereof;

Fig. 3 is an enlarged section showing the manner in which the cover sections are united at the trailing edge of the finished aerofoil;

Fig. 4 is a section similar to Fig. 1 showing a modified construction in which the beam section is substantially reinforced, and Fig. 5 is a section of the modification similar in its showing to the showing of Fig. 2.

In the embodiment of the invention selected for illustration a so-called balanced aerofoil (elevator) is shown. It is not intended, however, that the invention shall be thus limited. The same construction and the same method of assembly can be used for all aircraft control surfaces, ailerons, rudders, etc., and in fact, if desired, can be profitably used in the fabrication of aeroplane wings.

The aerofoil per se comprises four major sub-assemblies designated respectively A, B, C and D. The sub-assembly A is the nose or leading edge assembly. It comprises an outer metal skin 10 and a plurality of internal longitudinally spaced transversely extending stiffeners or nose ribs 12. The metal skin 10 is formed from a single strip or sheet of thin gauge material such as an alloy of aluminum, and at its opposite edges is extended beyond the rear edge of the internal stiffeners 11 as indicated at 12—12. The relation of such extended portions of the skin 10 to the other sub-assemblies B, C, and D of the aerofoil will be hereinafter more fully explained.

To secure the stiffeners 11 in place, each, along its opposite edges, is flanged as at 13, the flanges being welded, riveted or otherwise fastened to the inner surface of the metal skin. No seam or joint is required to be provided at or in the vicinity of the leading edge of the aerofoil.

Sub-assembly B, where the aerofoil of which it forms a part is not required to be heavily stressed, preferably consists of a metal beam 14 of channel section. When sub-assemblies A and B are brought together, said beam 14 has its web portion in engagement with the rear edges of the stiffeners 11, and its flanges in over-lapping relation with the extended portions 12—12 of the nose cover sheet 10.

The two remaining sub-assemblies C and D are of like construction. Each comprises a metal cover sheet 15 and a plurality of internal transversely extending ribs or stiffeners 16. These ribs 16 are preferably of substantially J shape in cross-section. Each along one edge is flanged as at 17 to provide for its attachment to the inner or undersurface of the cover sheet across which it extends. To admit of the cover sheets 15 being fastened to the flanges of the beam 14 and to the extended portions 12—12 of the nose assembly A, each stiffener 16, at its forward end, is shaped as at 18 (see Fig. 1). Thus shaped the flanges of the beam 14, in the final assembly of the aerofoil may be so related to the cover sections C and D as to provide at the joint between said cover sections and said beam an effective interlock. The interlocking engagement of the parts A, B, C and D, is best illustrated in Fig. 2. With the flanges of the beam interlocked, and the portions 12—12 of sub-assembly A overlapping the cover sheets 15, the three thicknesses of metal at said interlocking joint are riveted together as indicated at 19. Thus organized, two lines of rivets coextensive with the beam flanges, provide for the aerofoil an effective means for uniting the several sub-assemblies of which the aerofoil consists.

That the stiffeners or ribs 16 of the cover sections C and D may not interfere one with the other, said stiffeners 16, at their rear ends, are tapered off as indicated at 20, and only the flat sheet metal stock of the cover sheets 15 is carried to the trailing edge of the aerofoil. As a reinforcement at said trailing edge either a flattened tube or a looped flat stock stringer 21 may be provided. Rivets 22 are used to bind the two cover sheets and the stringer 21 together.

In the modification of Figs. 4 and 5, where reinforcement along the beam assembly is required, angle strips 23 are provided. These strips 23 are coextensive with the cover sheets 15 of the sub-assemblies C and D and have their inwardly projecting portions riveted as at 24 to the ends of the stiffeners 16. Prior to final assembly, said angle strips 23 enter into and form a part of the sub-assemblies C and D. In the finally assembled aerofoil, however, said strips 23 act in conjunction with the channel beam to provide in effect a substantial beam reinforcement.

In the manufacture of the aerofoil each of the several sub-assemblies is finished complete in and of itself before final assembly. In the making of sub-assembly A the stiffeners 11 are flanged, fitted within the embrace of the bent cover sheet 10, and thereafter riveted or otherwise fastened as indicated. The beam or intermediate sub-assembly B is separately formed, as are the sub-assemblies C and D, the latter being made complete and self-braced with the stiffeners fastened in place, before final assembly is initiated. In the final assembly, the riveting along the flanges of the beam serves as the only means by which the several sub-assemblies are fastened together. Where such riveting is accomplished prior to the fastening together of the cover sheets 15 at the trailing edge, such riveting can be done with a riveting machine. To admit of easy access to the beam 14, the trailing edges of the cover sheets 15 are separated or spread apart during a riveting operation. The riveting along the beam length having been accomplished, the trailing edge stringer 21 is fitted in place and the two cover sheets 15 brought against its opposite faces. Thus positioned, a riveting machine can be used to bind the cover sheets together. No wood screws or the like are required to be used. All riveting can be done with a riveting machine and each sub-assembly completed before final assembly is begun. Obviously, therefore, labor and production cost is reduced to an absolute minimum.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In an aerofoil; a nose section assembly comprising a single curved or bent strip having its edges extending substantially parallel and rearwardly, and nose ribs disposed within the curve of said strip and attached thereto, the rear edges of said ribs lying between and forward of the strip edges; a single beam comprising a single strip of sheet metal bent in channel form having its flanges extending rearwardly, each flange lying close to and substantially parallel to one edge of said curved strip, said beam, in the complete aerofoil lying substantially in the forward part of said aerofoil; a pair of cover assemblies, each comprising a substantially flat plate having its forward edge adapted to engage between one said beam flange and one rearwardly extending edge of said curved strip, said plate extending continuously rearward from said flange; means for fastening one said flange, one said forward plate edge, and one said rearwardly extending curved strip edge together; and means for fastening the rearward edges of said plates adjacent each other to form the trailing edge of said aerofoil.

2. In an aerofoil, a single transverse channel beam having a web with upper and lower flanges extending rearwardly from said web, a nose section comprising a curved sheet having a rearwardly facing upper edge overlying and attached to the upper flange of said beam and having a rearwardly facing lower edge overlying and attached to the lower flange of said beam, a pair of rearwardly extending cover plates having the forward edge of each lying between one said flange and one said nose section edge, the rearward edges of said cover plates being attached to each other to form the trailing edge of said aerofoil.

3. In an aerofoil, a transverse beam having a web and flanges extending rearwardly from the upper and lower edges of said web, each said flange having an inwardly turned rearward portion, a pair of cover plates each overlying one said flange and attached thereto, and cover stiffeners each attached to one said cover plate and to the corresponding inwardly turned portion of the flange to which said cover plate is attached.

4. In an aerofoil, a transverse beam having a web and flanges extending rearwardly from the upper and lower edges of said web, each said flange having an inwardly turned rearward portion, a pair of cover plates each overlying one said flange and attached thereto, cover stiffeners each attached to one said cover plate and to the corresponding inwardly turned portion of the flange to which said cover plate is attached, and a curved nose section having rearwardly extending upper and lower edges attached respectively to the upper and lower beam flanges, over the respective cover plates.

RALPH D. CARLETON.
RAYMOND C. BLAYLOCK.